United States Patent Office 3,438,972
Patented Apr. 15, 1969

3,438,972
PROCESS FOR PREPARING BENZODIAZEPINES
Werner Metlesics, Clifton, and Leo Henryk Sternbach, Upper Montclair, N.J., assignors to Hoffmann-La Roche Inc., Nutley, N.J., a corporation of New Jersey
No Drawing. Filed Nov. 10, 1964, Ser. No. 410,305
Int. Cl. C07d 53/06
U.S. Cl. 260—239    3 Claims

ABSTRACT OF THE DISCLOSURE

A process for oxidizing a 2-alkylamino-5-phenyl-3H-1,4-benzodiazepine to the corresponding 4-oxide wherein the 2-alkylamino grouping is protected by an acyl grouping which may be hydrolyzed after the reaction.

The present invention relates to new and novel processes. More particularly, the present invention relates to a new and novel process for the preparation of therapeutically useful benzodiazepines.

The novel process aspect of the present invention involves oxidizing a compound of the formula

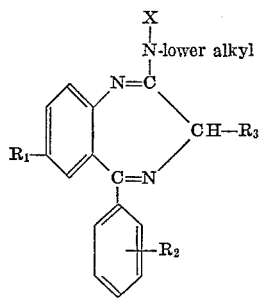

I wherein $R_1$ and $R_2$ are selected from the group consisting of hydrogen, halogen, trifluoromethyl, cyano and nitro, $R_3$ is selected from the group consisting of hydrogen and lower alkyl and X represents a group which is readily hydrolizable and which is capable of preventing the nitrogen atom from serving as an electron donator (or a proton acceptor) thereby rendering the said nitrogen atom insensitive to oxidation, with any suitable oxidizing agent whereby to prepare a compound of the formula

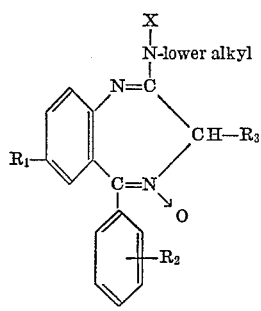

II wherein $R_1$, $R_2$, $R_3$ and X are as above subjecting the last-mentioned compound to hydrolizing conditions whereby to prepare a compound of the formula

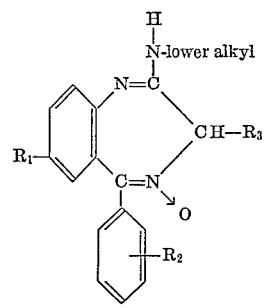

III wherein $R_1$, $R_2$ and $R_3$ are as above.

Compounds of the Formula III above are known to be highly valuable medicinal agents, particularly that compound of Formula III above which contains a 2-methylamino group and wherein $R_1$ is chloro and $R_2$ and $R_3$ are both hydrogen, i.e., chlordiazepoxide.

As is evident from the above, the oxidation of compounds of Formula I above to compounds of Formula II above can be effected with any suitable oxidizing agent, such as hydrogen peroxide or peracids. Representative of peracids utilizable for the purposes of the present invention are peracetic acid, trifluoroperacetic acid, perphthalic acid, persulfuric acid and the like.

The desired oxidation can be accomplished in a variety of ways. In one embodiment, the compound of Formula I above is added to an acidic medium followed by the addition of hydrogen peroxide thereto. In an alternate process aspect of the present invention, a peracid is prepared in situ and the compound to be oxidized is then added to the resultant mixture. The peracid is prepared by mixing hydrogen peroxide with a straight chain lower alkanoic acid or a functional derivative thereof, for example, acetic anhydride. Temperature is not a critical feature of this process step, and thus, the oxidation can be effected at room temperature or above or below room temperature.

The protecting group designated as X in Formula I above is represented by an acyl group, for example, a lower alkanoyl group such as acetyl, propionyl and the like, benzoyl and substituted benzoyl, or tosyl, mesyl, benzene sulfonyl and the like. In a preferred aspect, X represents acyl, most preferably, a lower alkanoyl group, advantageously, acetyl. However, it is of course to be understood that any suiable protecting group can be utilized for the purposes of the present invention. All that is required of such group is that (1) when the oxidation step is being performed in the conversion of compounds of Formula I above to compounds of Formula II above, it protects the nitrogen atom in position-2 of Formula I above whereby it is uneffected by the oxidation; and (2) that it be readily hydrolizable from compounds of Formula II above by conventional hydrolizing techniques.

The hydrolysis of the X group of compounds of Formula II above can be achieved utilizing any suitable hydrolizing agent. For example, compounds of Formula II can be treated with an alkali material, e.g., sodium hydroxide, basic alumina, and the like. The manner in which the hydrolysis is effected is not critical and accordingly, it can be conducted in any suitable solvent, at room temperature or above or below room temperature.

The process herein defined is particularly useful in that it provides a valuable synthetic route for the preparation of therapeutically useful benzodiazepines.

The term "halogen" as used herein is intended to connote all four forms thereof, namely, fluorine, bromine, iodine and chlorine. The term "lower alkyl" as employed throughout the present disclosure represents a straight or branched chain hydrocarbon group such as methyl, propyl, isobutyl and the like.

The following examples are illustrative of the present invention but not limitative thereof. All temperatures stated are in degrees centigrade.

Example 1

Peracetic acid was prepared by the dropwise addition of 3.35 g. of acetic anhydride to a stirred cold suspension (ice bath) of 0.75 ml. of 90% hydrogen peroxide and one drop of concentrated sulphuric acid in 3 ml. of methylene chloride. After stirring for 15 minutes at 0°, the solution was left at 25° for 30 minutes. The solution was then added dropwise, with stirring, to an ice cold solution of 3.0 grams (0.00092 mole) of 7-chloro-2-(N-methylacetamido)-5-phenyl-3H-1,4-benzodiazepine. The so-formed mixture was kept at 25° overnight, washed with water and dilute aqueous ammonia and then concentrated after drying over sodium sulphate. Crude 7-chloro-2-(N-methylacetamido) - 5 - phenyl-3H-1,4-benzodiazepine-4-oxide was obtained. The so-formed crude was placed on a column containing 90 grams of aluminum oxide (Woelm, basic, grade 1). Elution with ethyl acetate gave white prisms melting at 233–237°. After recrystallization from a mixture of methylene chloride and ether, 7-chloro-2-methylamino-5-phenyl-3H-1,4-benzodiazepine-4-oxide was obtained as crystals melting at 235–237°.

We claim:

1. A process which comprises oxidizing a compound of the formula

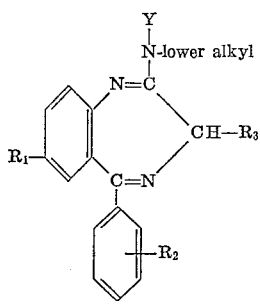

wherein $R_1$ and $R_2$ are selected from the group consisting of hydrogen, halogen, trifluoromethyl, cyano and nitro; $R_3$ is selected from the group consisting of hydrogen and lower alkyl and Y is selected from the group consisting of lower alkanoyl, benzoyl, substituted benzoyl, tosyl, mesyl and benzene sulfonyl, utilizing an oxidizing agent selected from the group consisting of hydrogen peroxide, peracetic acid, trifluoroperacetic acid, perphthalic acid and persulfuric acid at a temperature at about room temperature to below room temperature whereby to prepare a compound of the formula

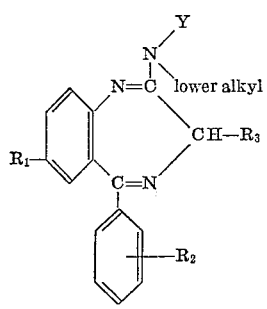

wherein $R_1$, $R_2$, $R_3$ and Y are as above.

2. A process which comprises oxidizing 7-chloro-2-(N-methylacetamido)-5-phenyl-3H-1,4 - benzodiazepine with an oxidizing agent selected from the group consisting of hydrogen peroxide, peracetic acid, trifluoroperacetic acid, perphthalic acid and persulfuric acid at a temperature at about or below room temperature whereby to form 7-chloro-2-(N - methylacetamido)-5-phenyl-3H-1,4-benzodiazepine-4-oxide and hydrolizing the so-formed product whereby to prepare 7-chloro-2-methylamino-5-phenyl-3H-1,4-benzodiazepine-4-oxide.

3. A process which comprises oxidizing a compound of the formula

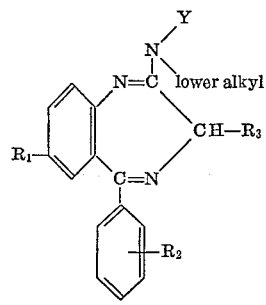

wherein $R_1$ and $R_2$ are selected from the group consisting of hydrogen, halogen, trifluoromethyl, cyano and nitro; $R_3$ is selected from the group consisting of hydrogen and lower alkyl and Y is selected from the group consisting of lower alkanoyl, benzoyl, substituted benzoyl, tosyl, mosyl and benzene sulfonyl, with an oxidizing agent selected from the group consisting of hydrogen peroxide, peracetic acid, trifluoroperacetic acid, perphthalic acid and persulfuric acid at a temperature at about or below room temperature whereby to prepare a compound of the formula

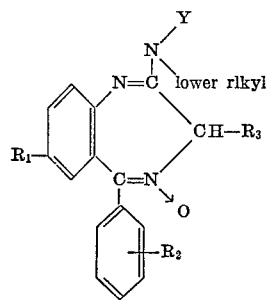

wherein $R_1$, $R_2$, $R_3$ and Y are as above and hydrolyzing the so-formed product whereby to prepare a compound of the formula

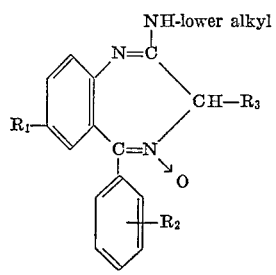

wherein $R_1$, $R_2$ and $R_3$ are as above.

References Cited

Culvenor: Reviews of Pure and Applied Chemistry, vol. 3, pp. 87–88 (1953).

Metlesics et al.: Chem. Abstracts, vol 59, pp. 13,988–13,989 (1963).

ALTON D. ROLLINS, *Primary Examiner.*

PO-1050
(5/69)

UNITED STATES PATENT OFFICE
CERTIFICATE OF CORRECTION

Patent No. 3,438,972  Dated April 15, 1969

Inventor(s) Werner Metlesics and Leo Henryk Sternbach

It is certified that error appears in the above-identified patent and that said Letters Patent are hereby corrected as shown below:

Column 3, line 70, (claim 1).

"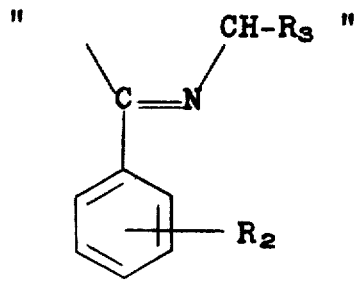"

should be:

--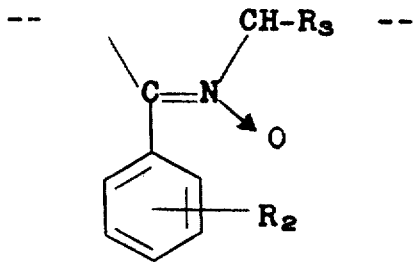--

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents